(12) United States Patent
Zhang et al.

(10) Patent No.: US 9,367,559 B1
(45) Date of Patent: Jun. 14, 2016

(54) DATA LOCALITY CONTROL FOR DEDUPLICATION

(71) Applicant: Symantec Corporation, Mountain View, CA (US)

(72) Inventors: Xianbo Zhang, Plymouth, MN (US); Haibin She, Beijing (CN); Xiaobing Song, Beijing (CN)

(73) Assignee: Veritas Technologies LLC, Mountain View, CA (US)

( * ) Notice: Subject to any disclaimer, the term of this patent is extended or adjusted under 35 U.S.C. 154(b) by 179 days.

(21) Appl. No.: 14/094,527

(22) Filed: Dec. 2, 2013

Related U.S. Application Data

(60) Provisional application No. 61/885,443, filed on Oct. 1, 2013.

(51) Int. Cl.
*G06F 17/00* (2006.01)
*G06F 17/30* (2006.01)

(52) U.S. Cl.
CPC .................. *G06F 17/30156* (2013.01)

(58) Field of Classification Search
CPC ....................................................... G06F 17/30
USPC ................................................. 707/600–899
See application file for complete search history.

(56) References Cited

U.S. PATENT DOCUMENTS

2012/0030477 A1* 2/2012 Lu ........................ G06F 11/1453
713/189

OTHER PUBLICATIONS

Zhang, Zhike et al., "A Novel Cache Prefetching Algorithm for Restoration Operations for Deduplication Systems", Proceedings of the International Conference of Information Engineering and Applications (IEA) 2012, Lecture Notes in Electrical Engineering, 2013, p. 331-337 (219), Springer.
Tan, Yujuan, et al., "Reducing The De-lineraization of Date Placement to Improve Dedeplication Performance", High Performance Computing, Networking, Storage and Analysis (SCC), 2012 SC Companion: Nov. 10-16, 2012, Salt Lake City, UT, p. 796-800, IEEE.
Simha, Dilip Nijagal et al., A Scalable Deduplication and Garbage Collection Engine for Incremental Backup, SYSTOR '13 Proceedings of the 6th International Systems and Storage Conference, 2013, Article No. 16, ACM, New York, ACM Digital Library article index and abstract.

* cited by examiner

*Primary Examiner* — Isaac M Woo
(74) *Attorney, Agent, or Firm* — Womble Carlyle Sandridge & Rice LLP

(57) ABSTRACT

A method for data locality control in a deduplication system is provided. The method includes forming a fingerprint cache from a backup image corresponding to a first backup operation. The method includes removing one or more fingerprints from inclusion in the fingerprint cache, in response to the one or more fingerprints having a data segment locality, in a container, less than a threshold of data segment locality. The container has one or more data segments corresponding to the one or more fingerprints. The method includes applying the fingerprint cache, with the one or more fingerprints removed from inclusion therein, to a second backup operation, wherein at least one method operation is executed through a processor.

19 Claims, 6 Drawing Sheets

DATA LOCALITY CONTROL FOR DEDUPLICATION

This application claims benefit of priority from U.S. Provisional Application No. 61/885,443, titled "DATA LOCALITY CONTROL FOR A DEDUPLICATION SYSTEM", filed Oct. 1, 2013, which is hereby incorporated by reference.

BACKGROUND

Systems that perform backups of data often make use of a fingerprint index and deduplication. In deduplication, a fingerprint is derived for each arriving data segment, and the fingerprint is compared to fingerprints in the fingerprint index. If there is a match between the fingerprint of the arriving data segment and a fingerprint in the fingerprint index, the newly arriving data segment is discarded, since the matching fingerprint in the fingerprint index indicates a copy of that data segment is already stored in backup storage. If no match is found between the fingerprint of the arriving data segment and the fingerprint index, the arriving data segment is stored in backup storage, and the fingerprint is added to the fingerprint index. Over time, and many backup operations, data segments can be stored in many differing containers. In a restore operation, the data segments must be retrieved from these many differing containers, in accordance with the appropriate backup image, which references the containers and the segments. The restore operation may be very time-consuming, due to the scattered data segments.

Deduplication systems tend to reduce backup storage by discarding as many data segments as possible, so stored segments of a backup image tend to be scattered among the whole storage system over time. Data locality is desirable for a data image restore or a data image tape-out, because a large amount of disk I/O (input/output) time will be spent in disk track seeking, for a backup image with bad data locality. It would be desirable that restoring a backup image from a year ago should have the same performance as restoring from the most recent backup image. Therefore, there is a need in the art for a solution which overcomes the drawbacks described above.

SUMMARY

In some embodiments, a method for data locality control in a deduplication system is provided. The method includes forming a fingerprint cache from a backup image corresponding to a first backup operation. The method includes removing one or more fingerprints from inclusion in the fingerprint cache, in response to the one or more fingerprints having a data segment locality, in a container, less than a threshold of data segment locality. The container has one or more data segments corresponding to the one or more fingerprints. The method includes applying the fingerprint cache, with the one or more fingerprints removed from inclusion therein, to a second backup operation, wherein at least one method operation is executed through a processor.

In some embodiments, a method for data locality control in a deduplication system is provided. The method includes analyzing a backup image as to data segment locality relative to containers. The method includes copying one or more data segments having a first data segment locality relative to a container, to a further container, wherein the first data segment locality is less than a threshold of data segment locality. The method includes revising the backup image to reference location, in the further container, of the one or more data segments, wherein at least one method operation is executed through a processor.

In some embodiments, a tangible, non-transitory, computer-readable media having instructions thereupon which, when executed by a processor, cause the processor to perform a method is provided. The method includes extracting a fingerprint referenced in a first backup image, the first backup image a result of a first backup operation, and determining data segment locality of the fingerprint relative to a container having a data segment corresponding to the fingerprint. The method includes denying the fingerprint a membership in a fingerprint cache, in response to the fingerprint having a data segment locality less than a first threshold of data segment locality. The method includes repeating the extracting, the determining, and the denying for a plurality of fingerprints referenced in the first backup image, and deduplicating data segments of a second backup operation, via application of the fingerprint cache, the fingerprint cache having a subset of a plurality of fingerprints referenced in the first backup image.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
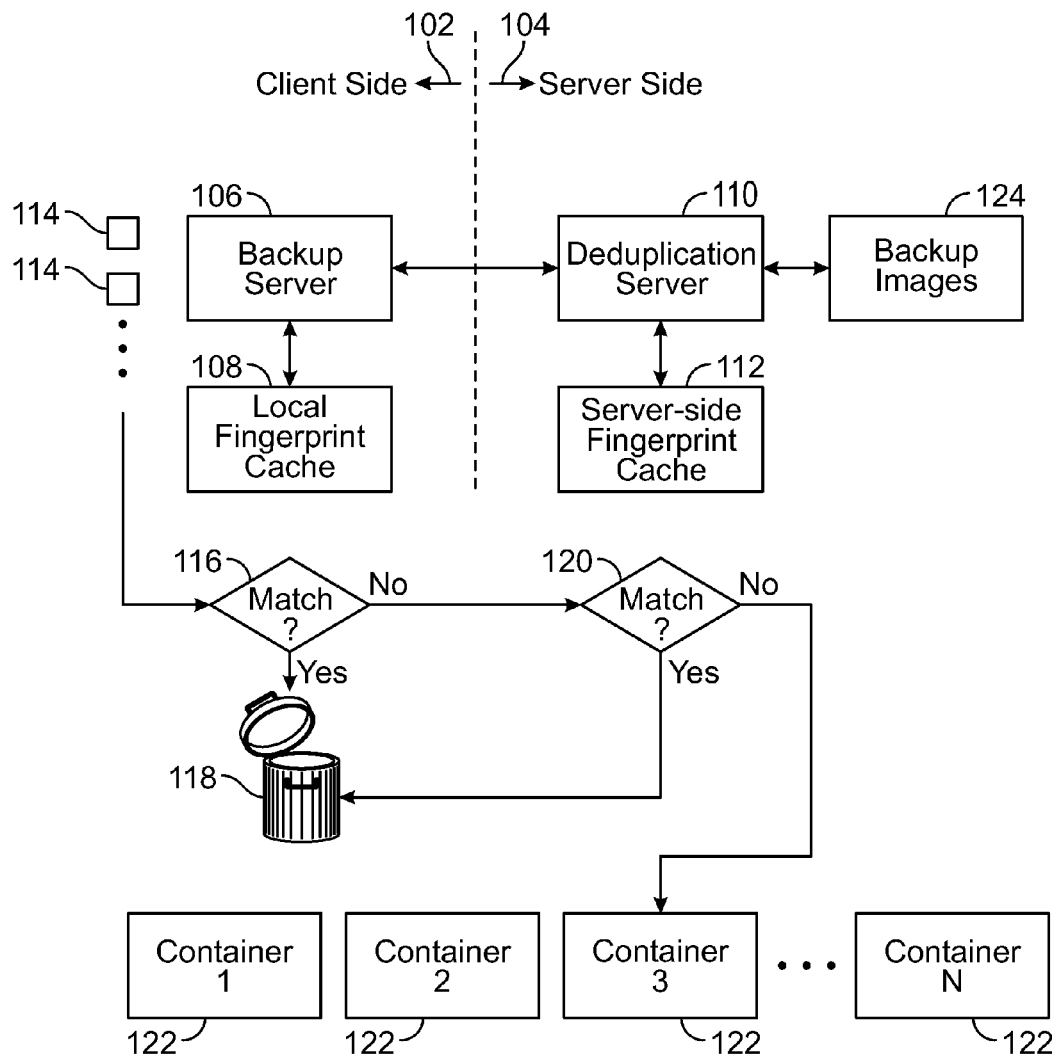
FIG. 1 is a system diagram showing an embodiment of a deduplication system with data segment locality control, in accordance with some embodiments.

Embodiments of a deduplication system, as disclosed herein, make use of a fingerprint index to deduplicate data when performing backups. Backup images are formed during backup operations, and are referenced during restore operations. Backup images are specific to clients and to each backup job or operation in some embodiments. The fingerprint index is maintained and accessed by the backup server and is shared across all of the clients.

Data segment locality, relative to the containers, is measured and controlled by embodiments of the disclosed deduplication system. Data segment locality refers to the level of data segments being scattered among numerous containers in some embodiments. In other words, data segment locality may refer to the level sequential data segments within a particular container in some embodiments. A large number of sequential data segments in a container have a higher data segment locality than a smaller number of sequential data segments in a container. Alternatively, a container that has a large total size, e.g., number of bytes or number of data segments, of data referenced by a specified backup image has a higher data segment locality than does a container with a smaller total size of data referenced by the specified backup image. By increasing data segment locality in the containers, the deduplication system decreases the amount of time taken by a restore operation. A restore operation takes less time, and proceeds more efficiently, when data segment locality in the containers is greater than a specified threshold, i.e., when containers generally each have a large number of sequential data segments.

In order to measure the data segment locality for the most recent backup job or operation, the deduplication system retrieves the backup image from the server side, and loads the fingerprints, in sequence, from the last backup image into a local fingerprint cache. The backup image references fingerprints and containers in a sequence used to restore data. The local fingerprint cache has a sequence of fingerprints from the last backup image. Each fingerprint references a container where the data segment corresponding to the fingerprint is stored. Here, the sequences of sequential fingerprints referencing the same container are compared to the specified threshold for data segment locality. If a sequence of sequential fingerprints referencing the same container meets or exceeds the specified threshold for data segment locality, that sequence is declared to have acceptable data segment locality in some embodiments. If a sequence of sequential fingerprints referencing the same container is less than the specified threshold for data segment locality, that sequence (and each fingerprint in the sequence) is declared to have low data segment locality in some embodiments.

Fingerprints in sequences with low data segment locality are removed from the local fingerprint cache. A subsequent backup from the same client is then deduplicated using the local fingerprint cache. Sequences of data segments matching fingerprint segments with high data segment locality are discarded as part of the deduplication process in some embodiments. Consequently, segments that would have been discarded as matching fingerprints in sequences with low data segment locality, prior to discarding those fingerprints from the local fingerprint cache, are now seen as not matching fingerprints in the local fingerprint cache and are newly stored in backup storage. It should be appreciated that such segments are more likely to be newly stored along with successive data segments in a container to produce high data segment locality. The deduplication system as described herein produces data locality control at the client side. In some embodiments, differing thresholds for data segment locality are associated with differing clients, or differing backup jobs.

The deduplication system also produces data locality control at the server side as discussed below. In some embodiments, the data locality at the server side is done in combination with the client side data locality control, for example by performing data locality control at the server side after data locality control at the client side. Alternatively, a system could perform the data locality control described herein at the client side or the server side and not both. For server side data locality control, the same analysis of sequential data segments and associated fingerprints, relative to the containers, is performed. Here, however, data segments with low data segment locality relative to a container are copied to a new container. The backup image is rewritten to reference the new locations of these data segments. In some embodiments, the threshold for data locality is set lower than the client side data locality threshold, as a result of overhead of copying segments in server side rebasing.

FIG. 1 is a system diagram showing an embodiment of a deduplication system with data segment locality control, in accordance with some embodiments. FIG. 1 is divided for illustrative purposes into a client side 102 and a server side 104. The client side 102 features communication and actions oriented towards one or more clients, the data of which needs backing up. The server side 104 features communication and actions oriented towards the data storage in some embodiments. In further embodiments, actions and devices can be combined or integrated, or further divided and rearranged as suit the particulars of an installation.

On the server side 104, a deduplication server 110 communicates with a server-side fingerprint cache 112, storage containers 122, and backup images 124. It should be appreciated that this communication may be achieved through a network backbone or other distributed communication service. The storage containers 122 can be implemented in various types of storage, for example hard drives, flash drives, etc. On the client side 102, a backup server 106 communicates with a local fingerprint cache 108. The backup server 106 and the deduplication server 110 communicate with each other, and, in a further embodiment could be integrated or combined into a server, or distributed over multiple servers. Arriving data segments 114, for example in a stream of data from a backup job, are examined by the backup server 106 to see if their fingerprints match fingerprints in the local fingerprint cache 108. In a decision action 116, if a fingerprint of a data segment 114 is found to match a fingerprint in the local fingerprint cache 108, the data segment 114 is discarded in some embodiments. The discarding is illustrated as a yes branch from the decision action 116, leading to a trashcan 118. It should be appreciated that discarding a data segment 114 results in that data segment 114 not being copied to one of the containers 122 and does not necessarily mean the data segment 114 is deleted.

In the decision action 116, if a fingerprint of a data segment 114 is not found to match a fingerprint in the local fingerprint cache 108, the data segment is sent along to the deduplication server 110. The deduplication server 110 follows a similar process, and looks to see if a match can be found in the server-side fingerprint cache 112 for the fingerprint of the data segment 114. In a decision action 120, if a match is found, the data segment is discarded, which is figuratively illustrated as a yes branch from the decision action 120 leading to the trashcan 118. It should be appreciated that discarding a data segment 114 results in that data segment 114 not being copied to one of the containers 122 in some embodiments. In the decision action 120, if a match is not found, the data segment is written to one of the containers 122, generally the next container that has available storage space. Some deduplication servers 110 may implement aging algorithms, in which data segments older than a certain date or older than a specified number of backups are deleted from the containers 122, i.e., the corresponding storage space is deallocated, which may affect where a newly arriving data segment 114 is stored. In order to control data locality, the deduplication system of FIG. 1 has various capabilities and performs various actions as will be further described below.

Data locality control is desirable for restore and/or tape-out performance from backup images in a deduplication system. Unfortunately, data locality with backup images having a high deduplication rate degrades over time without a suitable control mechanism. The embodiments described herein provide a method to achieve a balance between the deduplication rate and data locality for every backup image in a deduplication system. It should be appreciated that while achieving a desirable location for a particular backup image, deduplication across clients is still maintained. Data locality may be controlled through one or more of the below-listed techniques, some of which are further discussed below:

Data locality control in the file system side, i.e., client side 102 in FIG. 1.

Different data locality control thresholds for backups from different clients.

Data locality control at the client side 102.

Figure 3:
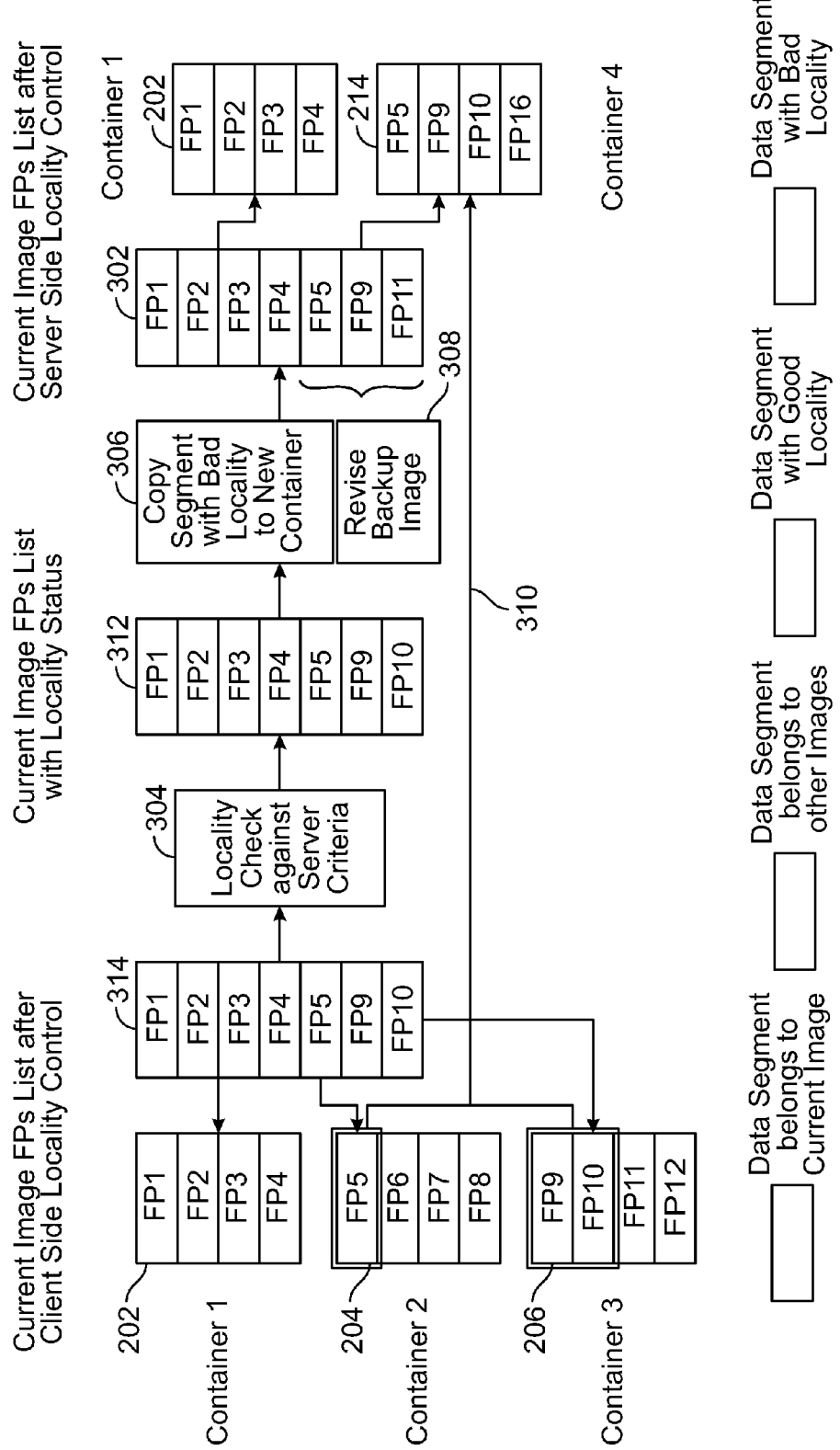
FIG. 3 is an action diagram depicting server-side data segment locality control, in accordance with some embodiments.

Global deduplication and data locality control at the server side 104 (See FIG. 3 for further discussion).

Data Locality Control from the File System Side:

A data container file should have as good locality as possible in whichever storage medium is used, e.g., hard disk. Many popular file systems (e.g., VXFS, XFS, EXT4) support extent, which is a list of sequential blocks in a hard disk. An appropriate extent size is set to make sure that a container file won't be scattered or fragmented too much in a hard disk in some embodiments.

Different Data Locality Control for Backup Images from Different Clients:

One measurement for data locality is the size or amount of sequential data in a container, for example, a count of the total number of bytes of sequential data segments in the container. As data locality of a file system can be at least partially controlled by an appropriate extent size, one assumption is that data containers are sequentially implemented in hard disks or other appropriate storage media. For a container referenced by an image, e.g., a backup image, the total size or amount of data segments referenced by the backup image can be used as a measurement of data locality of the backup image, in some embodiments. Selection of which measurement for data locality to apply may be system and/or situation dependent, as appropriate to various embodiments. Data locality can be measured or determined relative to a data segment, a fingerprint of a data segment, a container, and/or a backup image in some embodiments. For example, data segment locality of a data segment relative to a container could include a count of how many sequential data segments, including that data segment, are in the container. Data segment locality relative to a container or relative to a backup image could include a count of how many data segments referenced by the backup image, including that data segment, or in the container.

Backup images from different clients may have different restore performance requirements, and different locality controls may be applied for the different performance requirements in some embodiments. For images with higher restore performance requirements, the referenced data size per container threshold, i.e., the data locality threshold, may be set higher in some embodiments. For images with lower restore performance requirements, the referenced data size per container threshold, i.e., the data locality threshold, may be set lower in some embodiments.

As an example technique, and for purposes of illustration regarding data locality determination, the following conceptual example is provided. It should be appreciated that algorithms and mechanisms can be developed from this example. For a selected container, all of the data segments in the container are inspected or evaluated and sequential data segments are grouped together. These sequential data segments have high data locality, per one definition. Group data segments are referenced by a specified backup image together. These grouped data segments have high data locality, per another definition. Segments falling outside of either of these groups have low data locality. Data locality can also be determined for a container, relative to a specified backup image in some embodiments. A container having a large amount of sequential segments has high data locality, per one definition. A container having a low amount of sequential segments has low data locality, per that definition. A container having a large number of segments referenced by a specified backup image has high data locality, per another definition. A container having a low number of segments referenced by a specified backup image has low data locality, per that definition.

Data Locality Control at Client Side:

In some embodiments, data segment fingerprints of the last image, i.e., the most recent backup image, are retrieved from the server side 104 to build a client side local fingerprint cache 108 for deduplication. In some embodiments, this involves obtaining fingerprints from a server-side fingerprint cache 108 and forming a client-side fingerprint cache relative to the first backup image. The data segments corresponding to the retrieved fingerprints are protected at the server side 104 before the backup job is finished. The client side local fingerprint cache 108 is analyzed against a client side data locality threshold to remove the fingerprints with bad locality, so that segments with bad locality in the last image won't be referenced by the current or next backup image. This is further illustrated in FIG. 2 as discussed below.

Figure 2:
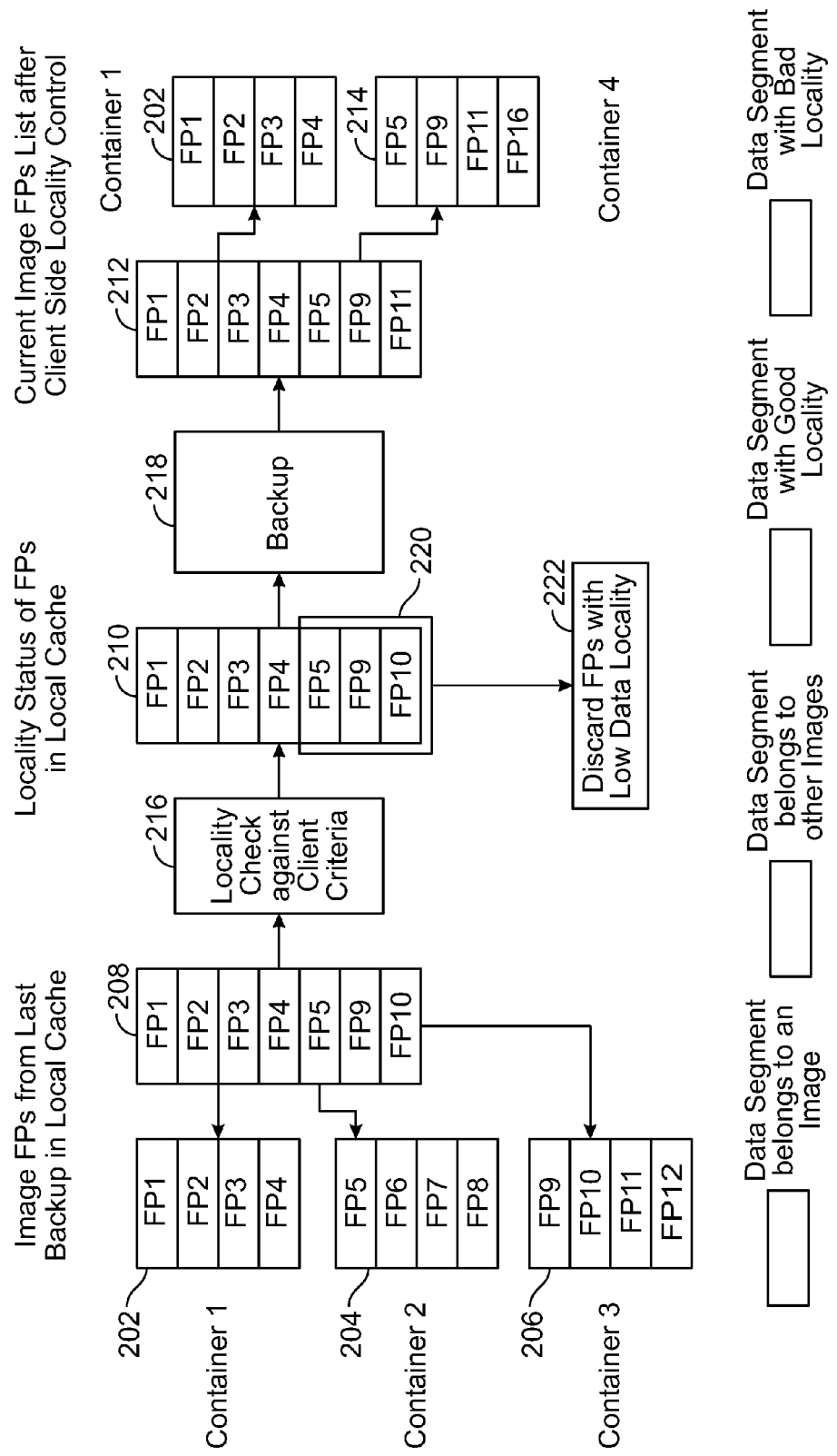
FIG. 2 is an action diagram depicting client-side data segment locality control, in accordance with some embodiments.

FIG. 2 is an action diagram depicting client-side data segment locality control. From a most recent backup job, data segments are stored in containers 202, 204, 206. This is represented in FIG. 2 as data segments corresponding to fingerprints 1-4 (FP1, FP2, FP3, FP4) in a first container 202, data segments corresponding to fingerprints 5-8 (FP5, FP6, FP7, FP8) in a second container 204, and data segments corresponding to fingerprints 9-12 (FP9, FP10, FP11, FP12) in a third container 206. Data segments corresponding to fingerprints 1-5 belong to the backup image, data segments corresponding to fingerprints 6-8 and data segments corresponding to fingerprints 11-12 belong to some other image in this example.

The fingerprints from the last or most recent backup job are shown in the local fingerprint cache 208, prior to culling of fingerprints. This is represented in FIG. 2 as fingerprints 1-5 and 9-10 in the local fingerprint cache 208. In this example, the first container 202 has high data locality when the data locality threshold is specified as three segments. As the first container 202 has four data segments in sequence (represented as fingerprints 1-4 in the first container 202), and all four data segments are associated with the most recent backup job, i.e., the last or most recent backup image, then the data locality is classified as high or acceptable. The second container 204 has low data segment locality, as only a single segment (corresponding to fingerprint 5) from the backup image is present in the second container 204. The third container 206 has low data segment locality, as only two segments (corresponding to fingerprint 9 and fingerprint 10) from the backup image are present in the third container 206, and as mentioned above for this example the data locality threshold is specified as three segments.

In an action 216, a locality check is performed against client criteria. This locality check determines the data segment locality as discussed above. Results of the locality check are shown in the locality status 210 of the fingerprint cache, where it is indicated that the fingerprints 1-4 correspond to data segments with good locality, i.e., the fingerprints 1-4 have acceptable locality, and the fingerprints 5 and 9-10 have unacceptable locality, i.e., correspond to data segments with low data locality. In an action 222, the fingerprints 220 with low data locality are discarded. In this example, it should be appreciated that the fingerprints 5 and 9-10 are discarded.

Next, a backup job 218 is performed, with deduplication. Since the fingerprints 5, 9 and 10 were discarded from the local fingerprint cache 208, the revised local fingerprint cache 212 still contains the fingerprints 1-4, and applies these to deduplication. The backup job 218, with deduplication via application of the revised local fingerprint cache 212, results in data segments corresponding to fingerprints 1-4 being located in the first container 202, where these data segments have remained since the previous backup. Since deduplication is applied, newly arriving data segments corresponding to fingerprints 1-4 are discarded, and not rewritten to the first container 202, and the backup image can rely on and reference these previously stored data segments in the first container 202. Data segments corresponding to fingerprints 5, 9 and 11 do not see a match in the revised local fingerprint cache 212, since fingerprints 5 and 9 are removed, and fingerprint 11 does not exist in the revised local fingerprint cache 212. The data segments corresponding to fingerprints 5, 9 and 11 are then written to the fourth container 214, as these data segments are not discarded during deduplication. The fourth container 214 then has a high or acceptable data locality, according to one measurement of data locality, since the fourth container 214 has three segments (namely, data segments corresponding to fingerprints 5, 9 and 11) referenced in the new recent backup image. Having three segments meets the specified threshold for data locality (three segments, in this example). A restore operation, applying the most recent backup image as pointing to data segments stored with high data locality in the first container 202 and the fourth container 214, would proceed efficiently.

Still referring to FIG. 2, if the fingerprints 5, 9 and 10 had not been removed, i.e. culled, from the local fingerprint cache 208, the data segments corresponding to the fingerprints 5 and 9 would have been discarded as having a match in the local fingerprint cache 208. Thus, the backup image would have relied on and referenced the previously stored data segment corresponding to fingerprint 5 in the second container 204, and the previously stored data segment corresponding to the fingerprint 9 in the third container 206. The data segment corresponding to fingerprint 11 would have been written to the fourth container, since the fingerprint 11 is not in the local fingerprint cache 208 and the segment corresponding to the fingerprint 11 would not have been discarded in deduplication. These actions would have resulted in the second container 204, the third container 206, and the fourth container 214 having low data segment locality, in contrast to the above-described results of applying data locality control.

It should be appreciated that the culling of fingerprints corresponding to data segments with low data locality, i.e., fingerprints with low or unacceptable data locality, can be performed before or after the formation of the local fingerprint cache 208. For example, an existing local fingerprint cache can be examined, and fingerprints with low or unacceptable data locality can be removed from the local fingerprint cache, i.e., deleted from the local fingerprint cache. Alternatively, if a local fingerprint cache does not yet exist, fingerprints can be added to a local fingerprint cache one at a time, or in parallel, with each fingerprint examined as to data locality. A fingerprint with high or acceptable data locality can be placed into the fingerprint cache, and a fingerprint with low or unacceptable data locality can be discarded and not placed into the fingerprint cache. Thus, a fingerprint with low data locality can be denied membership in the local fingerprint cache, or removed from inclusion in the fingerprint cache, by discarding the fingerprint prior to forming the fingerprint cache or after forming the fingerprint cache, as described above. In one embodiment, removing a fingerprint from inclusion in the fingerprint cache is implemented by setting an indication to not use that fingerprint for subsequent deduplication.

FIG. 3 is an action diagram depicting server-side data segment locality control. Deduplication at the server side 104 (from FIG. 1) is used to reduce redundant data among different clients. Fingerprints are sent to the server side 104 in batch for deduplication. If scattered data segments are made duplicates by Client A, these segments having good locality can be referenced by Client B without making any more duplicates. At the end of the backup job, the created backup image is analyzed against a server side data locality threshold, and segments with bad locality are copied to a new container and these new data segment copies instead of the scattered ones are referenced by the backup image. Server side data locality threshold is set lower than client side data locality threshold, in some embodiments, because the overhead of copying segments (server side rebasing) with bad locality is relatively high at the server side.

In the example shown in FIG. 3, the data containers 202, 204, 206 are depicted as having the same distribution of data segments corresponding to fingerprints as in the example presentation of FIG. 2. However, it should be appreciated that the server-side data segment locality control can be performed after any of the backup jobs, and further examples with various distributions of data segments in various data containers after other backup jobs can be envisioned. Continuing with the example, the current image fingerprint list 314 resembles the local fingerprint cache 208 of FIG. 2, but need not necessarily be so. The local fingerprint cache 208 of FIG. 2 could have a subset of all of the fingerprints of a backup image.

In this example, the current image fingerprint list 314 shows the fingerprints of the data segments as a result of performing a backup job. The data segments corresponding to the fingerprints 1-4 are stored in the first container 202, the data segment corresponding to the fingerprint 5 is stored in the second container 204, and the data segments corresponding to the fingerprints 9 and 10 are stored in the third container 206. In an action 304, a locality check against server criteria is performed. For example, the server criteria could include a data locality threshold of three segments, in which case the first container 202 is observed as having high or acceptable data locality, and the second container and the third container 206 are observed as having low or unacceptable data locality, i.e., data locality below the specified data locality threshold.

In this example, the current image fingerprint list 312 shows results of the locality check (in the action 304) against server criteria. It should be appreciated that, although the current image fingerprint list 312 in FIG. 3 appears similar to the locality status 210 in FIG. 2, results could differ with differing data locality thresholds, and with other backup jobs. Here, the current image fingerprint list 312 shows that the fingerprints 1-4 correspond to data segments with good locality relative to the server criteria, i.e., the fingerprints 1-4 have good locality, and the fingerprints 5 and 9-10 have bad locality, i.e., correspond to data segments with low data locality. In an action 306, data segments with bad locality are copied to a new container. This is depicted in FIG. 3 as a copy 310 of the data segment corresponding to the fingerprint 5, from the second container 204 into the fourth container 214, and the copy 310 of the data segments corresponding to the fingerprint 9 and fingerprint 10 from the third container 206 into the fourth container 214.

In an action 308, the backup image is revised. The result of revising or adjusting the backup image is shown in the current image fingerprint list 302, after server-side locality control. The current image fingerprint list 302 shows that the data segments corresponding to the fingerprints 1-4 reside in the first container 202, where these segments were prior to the revision of the backup image. The current image fingerprint list 302 shows that the data segments corresponding to the fingerprints 5, 9 and 10 reside in the fourth container 204, where these data segments were moved. A data segment corresponding to the fingerprint 16 also resides in the fourth container 214, and belongs to some other backup image. Thus, after the segments with low or unacceptable data locality are copied to a new container, and the backup image is revised, the first container 202 has high or acceptable data locality as before, and the fourth container 214 has high data locality. A restore operation, applying the most recent backup image as revised to point to data segment storage with high data locality in the first container 202 and the fourth container 214, would proceed efficiently.

Figure 4A:
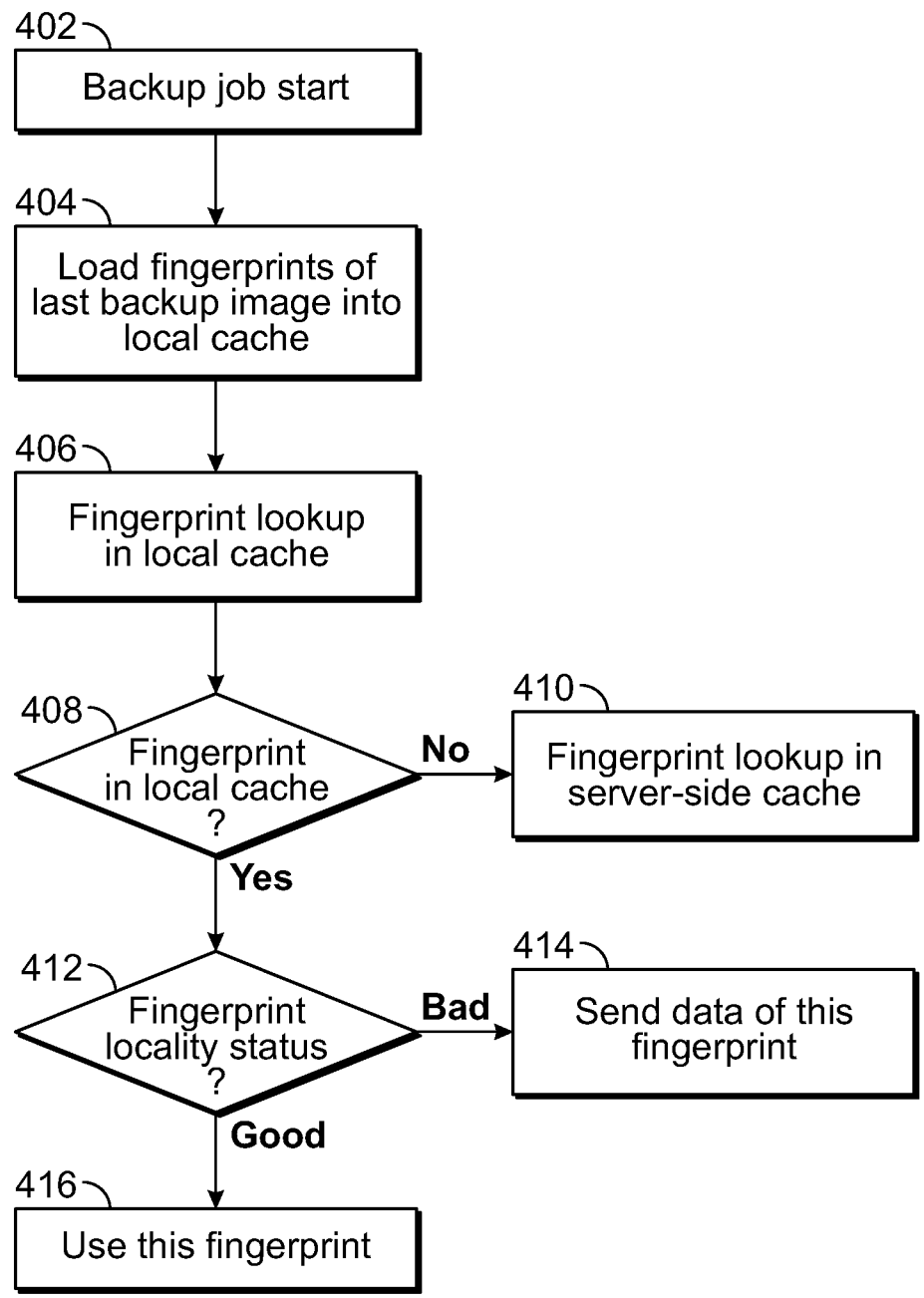
FIG. 4A is a flow diagram showing an embodiment of a method of data segment locality control, in accordance with some embodiments.

FIG. 4A is a flow diagram showing an embodiment of a method of data segment locality control. Particularly, the embodiment of FIG. 4A can be applied to a process of checking fingerprints from a local fingerprint cache, and applying fingerprints of the local fingerprint cache, as shown in FIG. 1. A backup job is started in an action 402. The fingerprints of the last backup image are loaded into the local cache, in an action 404. Fingerprints are looked up in the local fingerprint cache, in an action 406. For example, as data segments from the backup job arrive, each data segment could have a fingerprint generated, and the fingerprint could be looked up in the local fingerprint cache. In a decision action 408, the question is asked, is the fingerprint in the local fingerprint cache? If the answer is no, the fingerprint being looked up is not in the local fingerprint cache, then the fingerprint is looked up in the server-side cache, in an action 410. With reference back to FIG. 1, the data segment could be sent over to the server side, and the deduplication server could look up the fingerprint of the newly arriving data segment, in the server-side fingerprint cache in some embodiments.

If the answer to the decision action 408 question is yes, the fingerprint being looked up is in the local fingerprint cache, the flow proceeds to the decision action 412. In the decision action 412, the question is asked, is the fingerprint locality status acceptable or unacceptable? If the answer is, the fingerprint being looked up and found in the local fingerprint cache has unacceptable locality status, then the data corresponding to that fingerprint is sent, in an action 414. For example, the data segment could be sent over to the server-side for backup and deduplication using the server-side fingerprint cache. If the answer is, the fingerprint being looked up and found in the local fingerprint cache has acceptable locality status, then this fingerprint is used, in an action 416. For example, the fingerprint could be used in the local fingerprint cache, for client-side deduplication. Thus, the flow shown in FIG. 4A can be applied to decisions granting or denying membership of fingerprints to the local fingerprint cache, and can be applied to use of the fingerprints in the local fingerprint cache. It should be appreciated that the acceptable or unacceptable locality status may be determined by comparing a locality status value to a data locality threshold value as described above.

Figure 4B:
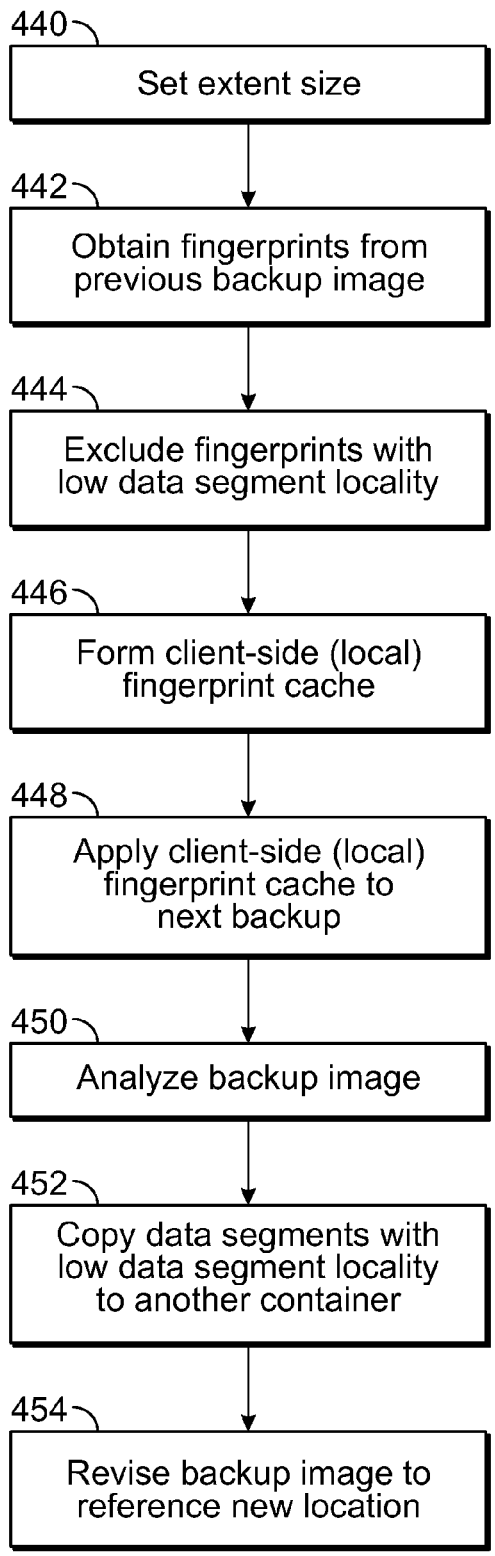
FIG. 4B is a flow diagram showing an embodiment of a method of data segment locality control, in accordance with some embodiments.

FIG. 4B is a flow diagram showing an embodiment of a method of data segment locality control. Particularly, the embodiment of FIG. 4B can be applied to processes of culling fingerprints from a local fingerprint cache, applying the fingerprints of the local fingerprint cache in client-side deduplication with data locality control, and applying server-side deduplication with data locality control. It should be appreciated that these processes can be applied separately or in combination. The extent size is set, in an action 440. For example, the extent size of data container files relative to hard disks could be specified via a file system, as discussed above regarding data locality control from the file system side. The extent size could be different for differing clients, or differing backup jobs, or could be the same, in various embodiments.

Fingerprints are obtained from a previous backup image, in an action 442. For example, the backup image could be retrieved from the server side, and fingerprints could be extracted from the backup image. In an action 444, fingerprints with low data segment locality are excluded. For example, one of various definitions of data segment locality could be applied, and a threshold for data segment locality could be specified. Data segment locality of a fingerprint could be determined, and compared to the threshold, with results of this determination and comparison applied to inclusion or exclusion of the fingerprint. In an action 446, the client-side or local fingerprint cache is formed. These actions of obtaining fingerprints, excluding or including fingerprints, and forming the fingerprint cache can be performed in various orders as readily devised from the teachings disclosed herein. The threshold applied in determining data segment locality of the fingerprints could be different for differing clients, or differing backup jobs, or could be the same.

In an action 448, the client-side local fingerprint cache is applied to the next backup. This should result in data segments having high data segment locality in the various containers, as a result of client-side data locality control per the above actions. In an action 450, a backup image is analyzed. This could be the backup image produced by the action 448, in a case where server-side data segment locality control is applied following application of client-side data locality control. Alternatively, where these processes are applied independently, the backup image analyzed in the action 450 could be another backup image in some embodiments. As described above, server-side data segment locality control could apply a different, possibly a lower, threshold value as compared to the data segment locality threshold value applied in client-side operations.

Data segments with low data segment locality are copied to another container, in an action 452. The backup image is revised, to reference the new location of the data segments, in an action 454. It should be appreciated that the data segments remaining in the initial containers are not deleted after the copy operation, as other backup jobs could still refer to these data segments in their earlier locations in the initial containers in some embodiments. In some embodiments, after multiple backup images are revised, there could be a cleanup operation that deletes unreferenced or de-allocated data segments in initial containers. This could be coordinated across the backup images, for data coherency. The copying of the data segments to another container, and the revision of the backup image, should result in data segments having high data segment locality in various containers, as a result of server-side data locality control per the above actions.

Figure 5:
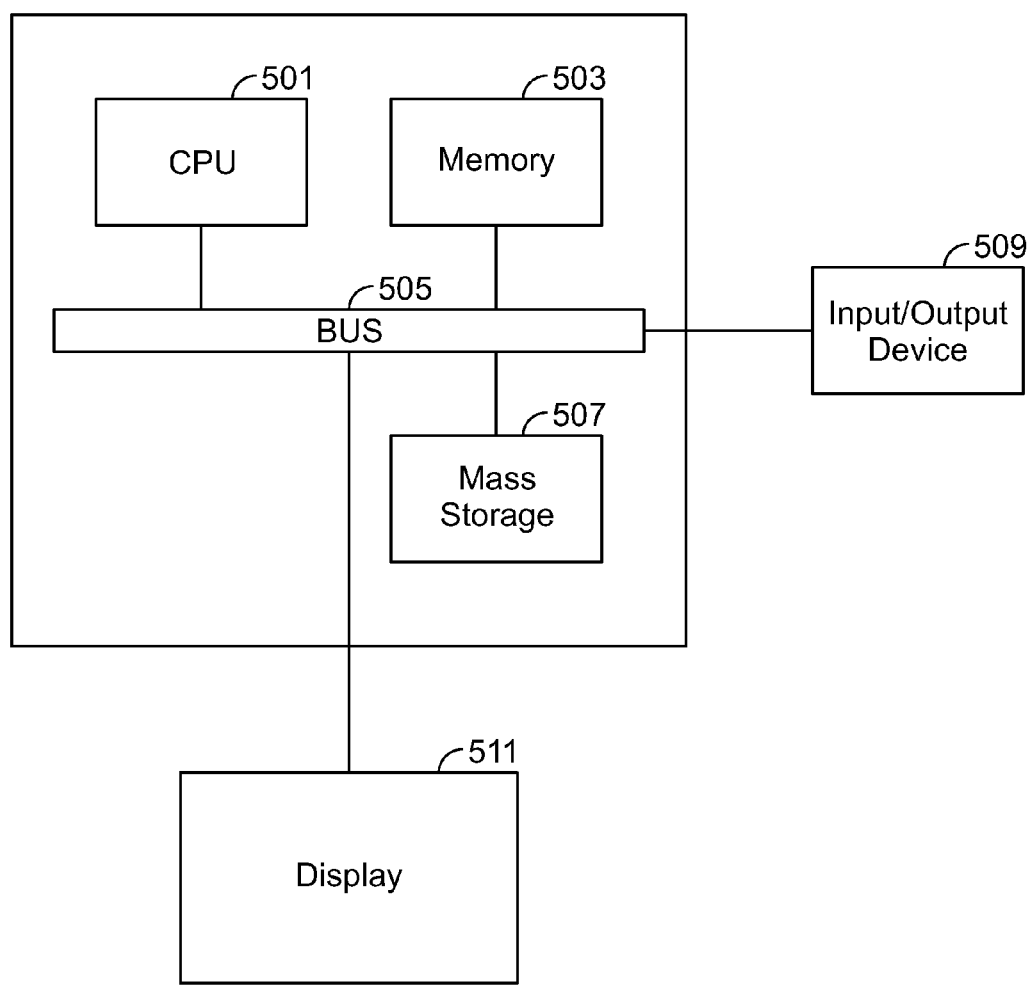
FIG. 5 is an illustration showing an exemplary computing device which may implement the embodiments described herein, in accordance with some embodiments.

It should be appreciated that the methods described herein may be performed with a digital processing system, such as a conventional, general-purpose computer system. Special purpose computers, which are designed or programmed to perform only one function may be used in the alternative. FIG. 5 is an illustration showing an exemplary computing device which may implement the embodiments described herein. The computing device of FIG. 5 may be used to perform embodiments of the functionality for data segment locality control, backup and deduplication in accordance with some embodiments. The computing device includes a central processing unit (CPU) 501, which is coupled through a bus 505 to a memory 503, and mass storage device 507. Mass storage device 507 represents a persistent data storage device such as a disc drive or flash drive, which may be local or remote in some embodiments. The mass storage device 507 could implement a backup storage, in some embodiments. Memory 503 may include read only memory, random access memory, etc. Applications resident on the computing device may be stored on or accessed via a computer readable medium such as memory 503 or mass storage device 507 in some embodiments. Applications may also be in the form of modulated electronic signals modulated accessed via a network modem or other network interface of the computing device. It should be appreciated that CPU 501 may be embodied in a general-purpose processor, a special purpose processor, or a specially programmed logic device in some embodiments.

Display 511 is in communication with CPU 501, memory 503, and mass storage device 507, through bus 505. Display 511 is configured to display any visualization tools or reports associated with the system described herein. Input/output device 509 is coupled to bus 505 in order to communicate information in command selections to CPU 501. It should be appreciated that data to and from external devices may be communicated through the input/output device 509. CPU 501 can be defined to execute the functionality described herein to enable the functionality described with reference to FIGS. 1-4. The code embodying this functionality may be stored within memory 503 or mass storage device 507 for execution by a processor such as CPU 501 in some embodiments. The operating system on the computing device may be MS DOS™, MS-WINDOWS™, OS/2™, UNIX™, LINUX™, iOS™, or other known operating systems. It should be appreciated that the embodiments described herein may be integrated with virtualized computing system also.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

A module, an application, a layer, an agent or other method-operable entity could be implemented as software executing on a processor, hardware, firmware, or combinations thereof. It should be appreciated that, where a software-based embodiment is disclosed herein, the software can be embodied in a machine and is not merely a disembodied idea.

The embodiments can also be embodied as non-transitory computer readable code on a computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method for data locality control in a deduplication system, comprising:
    forming a fingerprint cache from a backup image corresponding to a first backup operation;
    removing one or more fingerprints from inclusion in the fingerprint cache, in response to the one or more fingerprints having an amount of data segment locality, in a container, that is less than a threshold of data segment locality, wherein the container has one or more data segments corresponding to the one or more fingerprints; and
    applying the fingerprint cache, with the one or more fingerprints removed from inclusion therein, to a second backup operation, wherein at least one method operation is executed through a processor.

2. The method of claim 1, wherein removing the one or more fingerprints from inclusion in the fingerprint cache includes one of:
    discarding the one or more fingerprints prior to forming the fingerprint cache; or
    discarding the one or more fingerprints after forming the fingerprint cache.

3. The method of claim 1, wherein data segment locality includes a count of how many sequential data segments, including the one or more data segments, are in the container.

4. The method of claim 1, wherein data segment locality includes a count of how many data segments referenced by the backup image, including the one or more data segments, are in the container.

5. The method of claim 1, wherein removing one or more fingerprints from inclusion in the fingerprint cache includes setting an indication to not use the one or more fingerprints for subsequent deduplication.

6. The method of claim 1, wherein removing one or more fingerprints from inclusion in the fingerprint cache includes deleting the one or more fingerprints from the fingerprint cache.

7. The method of claim 1, wherein forming the fingerprint cache from the backup image includes obtaining fingerprints from a server-side fingerprint cache and forming a client-side fingerprint cache relative to the backup image.

8. The method of claim 1, further comprising one of:
    increasing the threshold in response to a higher performance requirement; or
    decreasing the threshold in response to a lower performance requirement.

9. The method of claim 1, further comprising:
    setting an extent size of a hard disk, as applied to storage of sequential data segments in a container.

10. A processor-based method for data locality control in a deduplication system, comprising:
    generating a fingerprint cache based on a backup image, wherein the backup image is a result of a first backup operation;
    determining, for fingerprints, an amount of data segment locality of corresponding segments in a container;
    excluding one or more fingerprints from the fingerprint cache, responsive to a determination that the one or more fingerprints have corresponding segments with data segment locality in the container that is less than a threshold of data segment locality; and
    performing a second backup operation with application of the fingerprint cache having the one or more fingerprints excluded therefrom.

11. The method of claim 10, wherein excluding the one or more fingerprints from the fingerprint cache comprises discarding the one or more fingerprints, and wherein the fingerprint cache is formed without the one or more fingerprints.

12. The method of claim 10, wherein excluding the one or more fingerprints from the fingerprint cache comprises removing the one or more fingerprints from the fingerprint cache.

13. The method of claim 10, wherein determining the data segment locality comprises counting how many data segments are sequential in the container.

14. The method of claim 10, wherein determining the data segment locality comprises counting how many data segments in the container are referenced by the backup image.

15. The method of claim 10, wherein excluding the one or more fingerprints from the fingerprint cache comprises indicating to not use the one or more fingerprints for deduplication in at least the second backup operation.

16. The method of claim 10, wherein excluding the one or more fingerprints from the fingerprint cache comprises deleting the one or more fingerprints, in the fingerprint cache.

17. The method of claim 10, wherein generating the fingerprint cache comprises accessing a server-side fingerprint cache and generating the fingerprint cache based on fingerprints of the server-side fingerprint cache and contents of the backup image.

18. The method of claim 10, further comprising:
    setting the threshold of data segment locality responsive to a performance requirement.

19. The method of claim 10, further comprising:
    setting an extent size, relative to sequential blocks for the container, in a storage medium.

* * * * *